(12) United States Patent
Sugiyama et al.

(10) Patent No.: US 8,350,620 B2
(45) Date of Patent: Jan. 8, 2013

(54) INTEGRATED CIRCUIT POWER CONSUMPTION CALCULATING APPARATUS AND PROCESSING METHOD

(75) Inventors: Itsumi Sugiyama, Kawasaki (JP); Tomohiro Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/493,432

(22) Filed: Jun. 11, 2012

(65) Prior Publication Data

US 2012/0249230 A1    Oct. 4, 2012

Related U.S. Application Data

(63) Continuation of application No. PCT/JP2009/006888, filed on Dec. 15, 2009.

(51) Int. Cl.
*H01L 25/00* (2006.01)
(52) U.S. Cl. .......................... 327/564; 714/22
(58) Field of Classification Search .................. 327/564; 714/22; 702/60
See application file for complete search history.

(56) References Cited

U.S. PATENT DOCUMENTS

| 6,094,527 A | 7/2000 | Tsukamoto et al. |
| 6,321,168 B1 | 11/2001 | Shimazaki |
| 2003/0204340 A1* | 10/2003 | Ootouge .......................... 702/60 |

FOREIGN PATENT DOCUMENTS

| JP | 5-126872 | 5/1993 |
| JP | 10-11482 | 1/1998 |
| JP | 11-213019 | 8/1999 |
| JP | 2000-148833 | 5/2000 |

OTHER PUBLICATIONS

International Preliminary Report on Patentability mailed Jun. 28, 2012 (English translation mailed Jul. 19, 2012) issued in corresponding International Patent Application No. PCT/JP2009/006888.
English translation of Written Opinion of the International Searching Authority mailed Feb. 2, 2010 issued in corresponding International Patent Application No. PCT/JP2009/006888.
CB-Power: A Hierarchical Power Analysis and Characterization Environment of Cell-Based CMOS Circuits (Wen-Zen Shen et al, Oct. 10, 1997, pp. 1908-1914).
International Search Report of Corresponding PCT Application PCT/JP2009/006888 mailed Feb. 2, 2010.

* cited by examiner

*Primary Examiner* — Lincoln Donovan
*Assistant Examiner* — Daniel Rojas
(74) *Attorney, Agent, or Firm* — Staas & Halsey LLP

(57) ABSTRACT

An integrated circuit power consumption calculating apparatus obtains power consumption of an integrated circuit by outputting circuit component transistor connection information of each of circuit components after setting a group of transistors connected via a source terminal/drain terminal of a transistor within each cell of an integrated circuit, by outputting circuit component logic model information after extracting a logic for each of the circuit components from the circuit component transistor connection information information, by obtaining power information (circuit component power information) of each signal transition state of an input/output terminal for each of the circuit components based on the circuit component transistor connection information information, by generating signal terminal transition information with a logic simulation performed for each of the circuit components of the integrated circuit, and by obtaining power consumption in a signal transition of an input/output terminal of each of the circuit components.

7 Claims, 18 Drawing Sheets

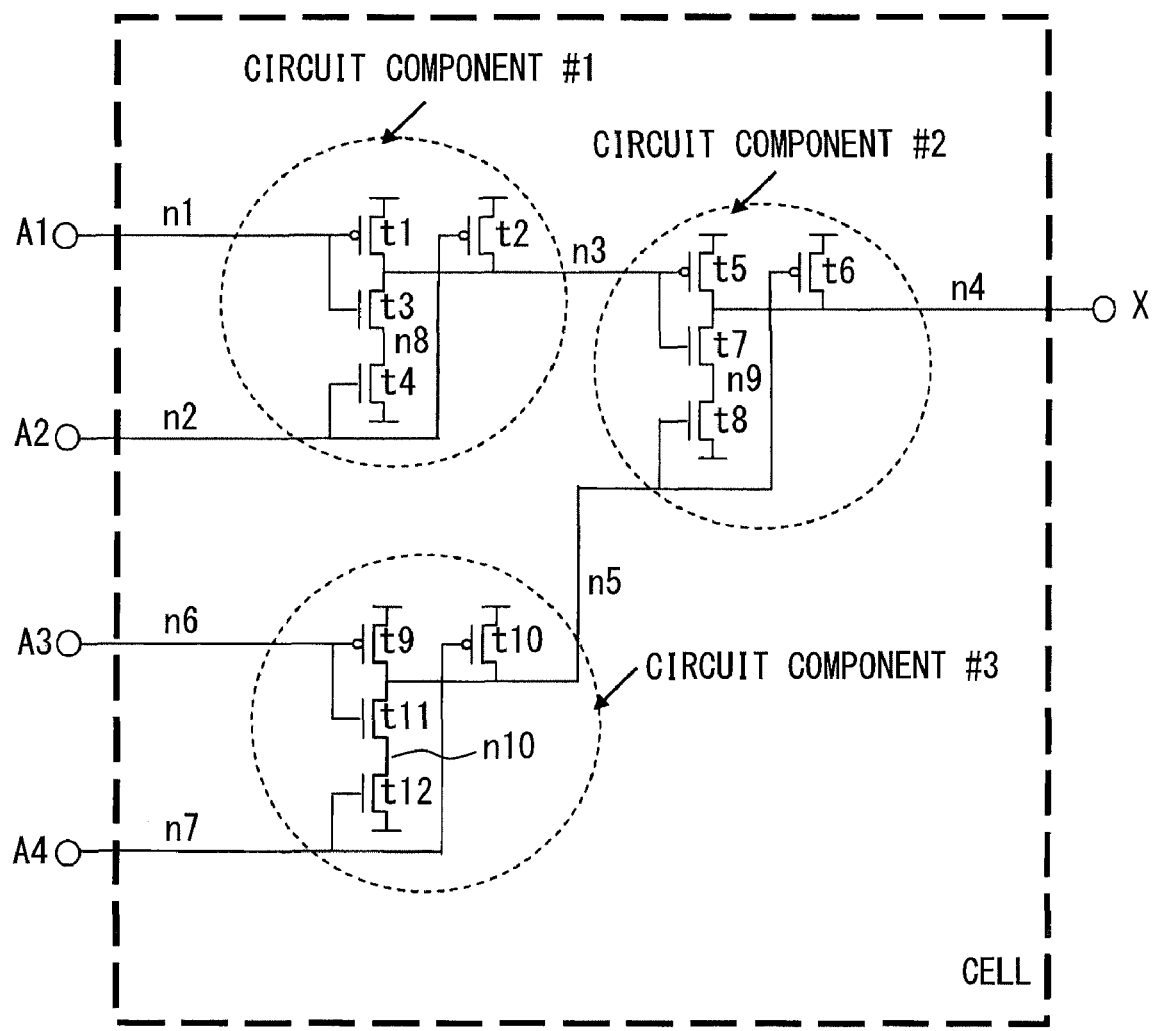
 : PARTITIONED CIRCUIT COMPONENT
F I G. 2

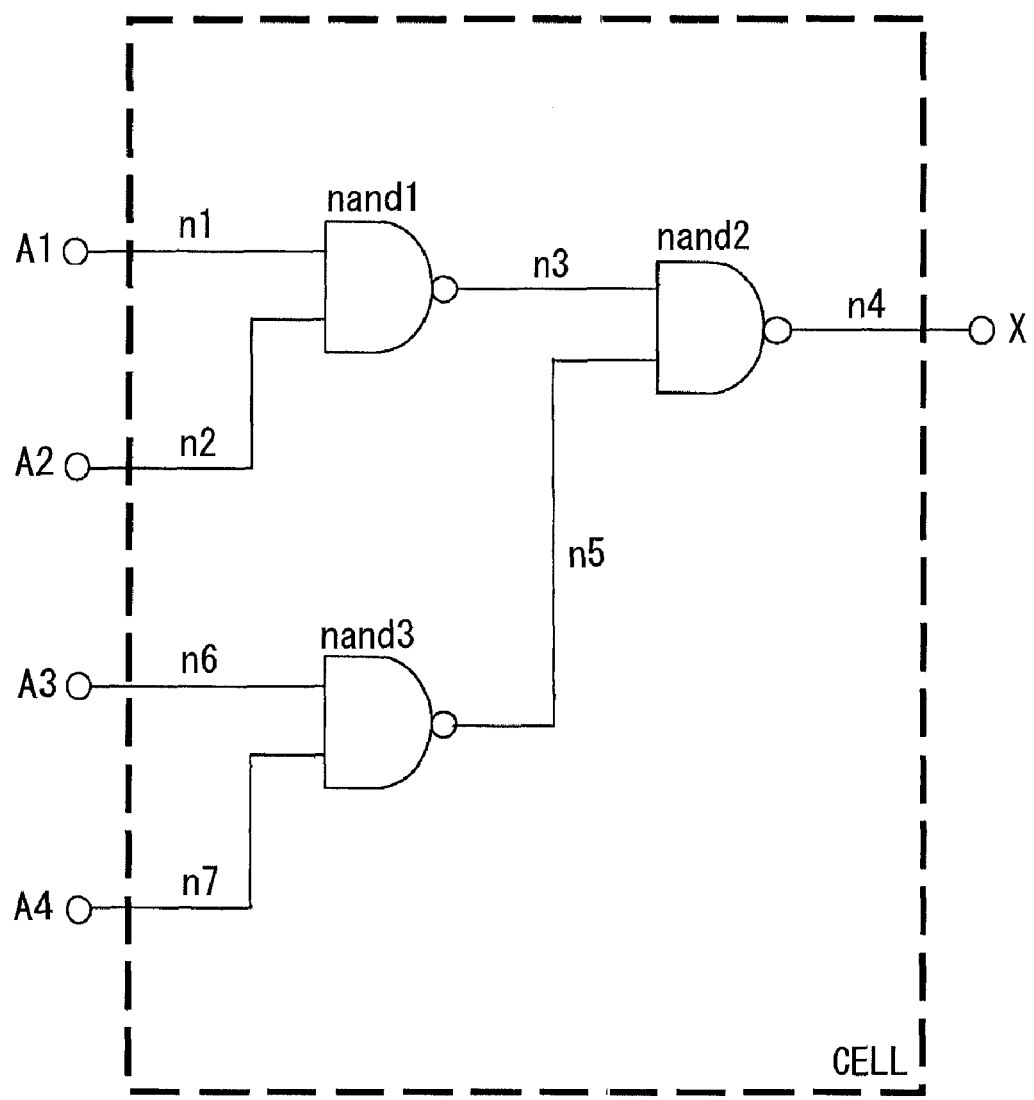
F I G. 4

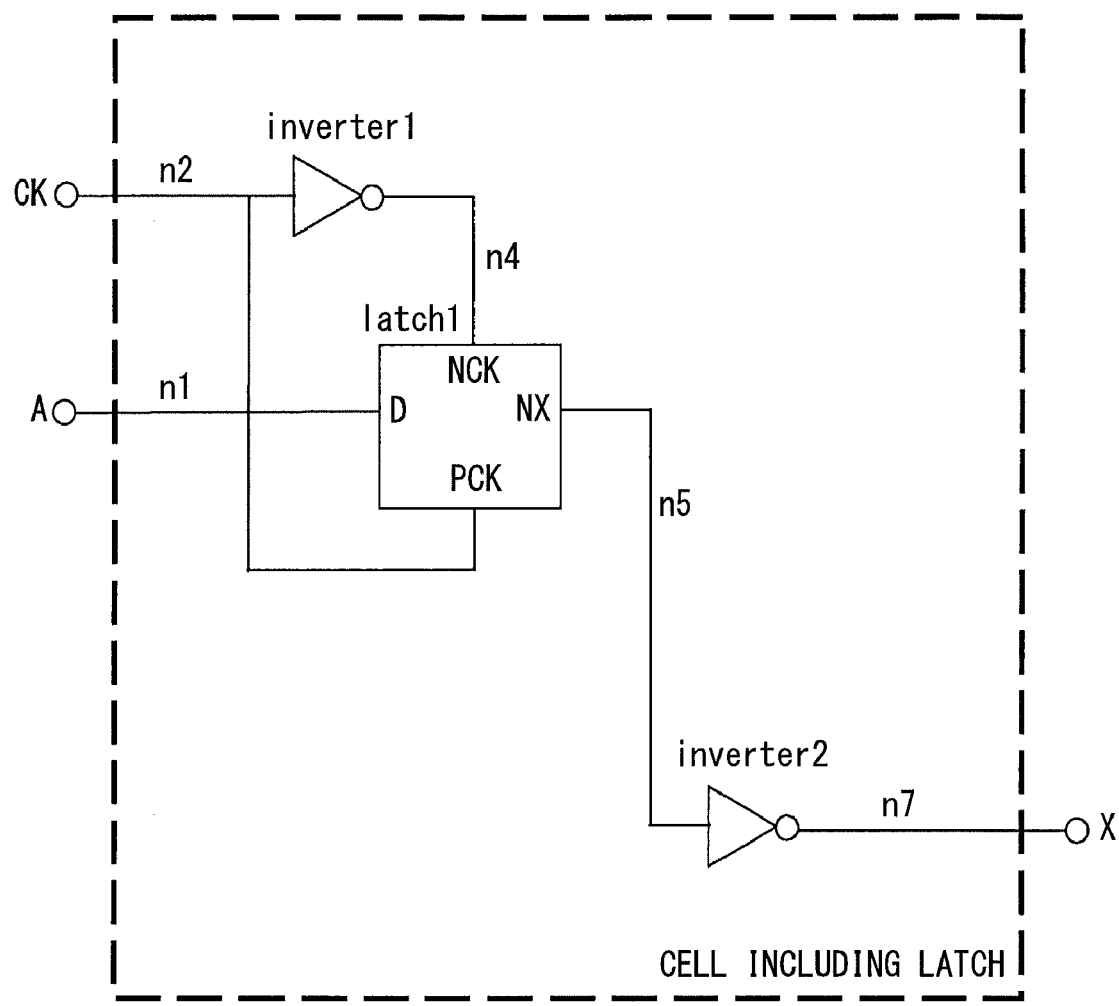
F I G. 5

```
.SUBCKT AND2 X1 A1 A2 VDD VSS
mt1 n4 A1 VDD VDD pch W=1u L=0.1u
mt2 n4 A2 VDD VDD pch W=1u L=0.1u
mt3 n4 A1 n3 VSS nch W=1u L=0.1u
mt4 n3 A2 VSS VSS nch W=1u L=0.1u
mt5 X1 n4 VDD VDD pch W=1u L=0.1u
mt6 X1 n4 VSS VSS nch W=1u L=0.1u
.ENDS AND2
```

22

⎧ TRANSISTORS WITHIN CELL ⎫

F I G. 8

```
.SUBCKT AND21 T1 T2 T3 VDD VSS
mt1 T3 T1 VDD VDD pch W=1u L=0.1u
mt2 T3 T2 VDD VDD pch W=1u L=0.1u
mt3 T3 T1 n3 VSS nch W=1u L=0.1u
mt4 n3 T2 VSS VSS nch W=1u L=0.1u
.ENDS AND21
```
CIRCUIT COMPONENT WITHIN CELL

```
.SUBCKT AND22 T1 T2 VDD VSS
mt5 T2 T1 VDD VDD pch W=1u L=0.1u
mt6 T2 T1 VSS VSS nch W=1u L=0.1u
.ENDS AND22
```
CIRCUIT COMPONENT WITHIN CELL

31

F I G. 9

LOGIC DESCRIPTION OF CELL
```
module AND2(A1, A2, X1);
input A1, A2 ;
output X1 ;
wire n4 ;
AND21 a (.T1(A1), .T2(A2), .T3(n4));
AND22 b (.T1(n4), .T2(X1));
endmodule
```

LOGIC DESCRIPTION OF CIRCUIT COMPONENT
```
module AND21(T1, T2, T3);
    input T1, T2;
    output T3;
    assign T3 = ~(T1 & T2) ;
endmodule
```

LOGIC DESCRIPTION OF CIRCUIT COMPONENT
```
module AND22(T1, T2);
    input T1;
    output T2;
    assign T2 = ~T1 ;
endmodule
```

FIG. 10

POWER INFORMATION OF CIRCUIT COMPONENT
```
cell(AND21) {
 cell_leakage_power:23.4668;
 pin(T1) {
  direction:input;
  rise_capacitance:0.0160647;
  fall_capacitance:0.0160716;
 }
    :
    :
  internal_power() {
   related_pin:"T1";
   rise_power(energy_template_1) {
   index_1("0.0032");
   values("0.0019");
   }
    :
    :
    :
```

POWER INFORMATION OF CIRCUIT COMPONENT
```
cell(AND22) {
 cell_leakage_power:22.6677;
    :
  internal_power() {
   related_pin:"T1";
   rise_power(energy_template_7) {
     index_1("0.001,0.003,0.01,0.03,0.1,0.3");
     values("0.0016,0.0032,0.0067,0.0121,0.0245,0.0517"):
    :
    :
```

FIG. 11

```
                    ⋮
              $scope module ab $end
INFORMATION   $var port 1 %2 X1 $end
COLLECTION    $scope module a $end
POINTS AFTER  $var port 1 %3 T1 $end
CIRCUIT       $var port 1 %4 T2 $end
COMPONENT IS  $var port 1 %5 T3 $end
PARTITIONED   $upscope $end
              $scope module b $end
              $var port 1 %6 T1 $end
              $var port 1 %7 T2 $end
                    ⋮
SIGNAL        #12345
TRANSITIONS   1%2
AT            1%3
INFORMATION   1%4
COLLECTION    0%5
POINTS        0%6
              1%7
                    ⋮
SIGNAL        #12347
TRANSITIONS   0%2
AT            0%3
INFORMATION   0%4
COLLECTION    1%5
POINTS        1%6
              0%7
                    ⋮
```

\*NAME_MAP
\*0 w2

WIRING
CAPACITANCE → \*D_NET  \*0 13.718

FIG. 14

```
36 ┐
    Total power consumption
    ========================
    Power(Watts)
    Power contribution    Static    Dynamic    Total
    ------------------    ------    -------    -----
    Total power           311mW     4.11W      4.42W
    :
```

FIG. 15

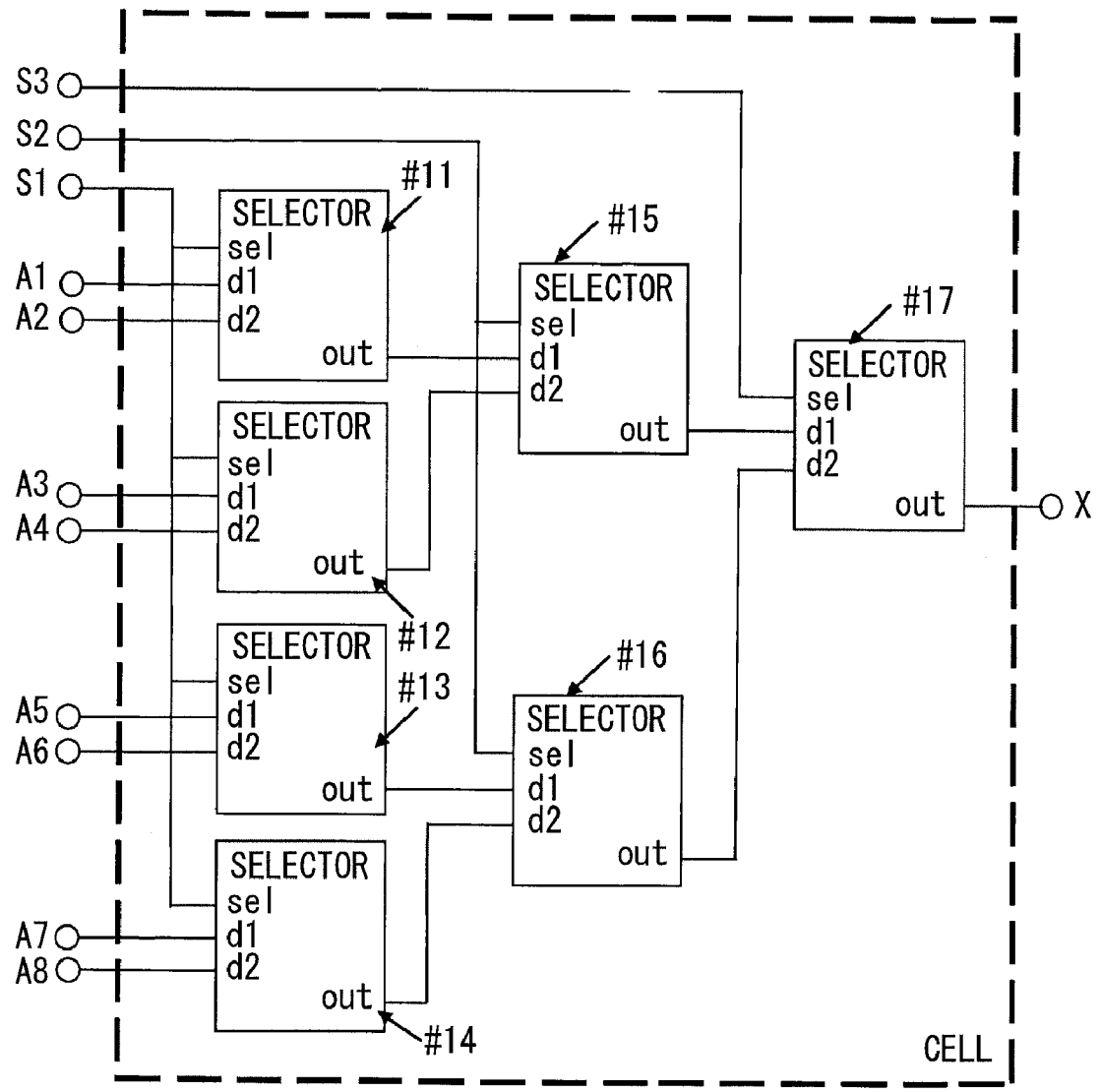
F I G. 17

INTEGRATED CIRCUIT POWER CONSUMPTION CALCULATING APPARATUS AND PROCESSING METHOD

CROSS-REFERENCE TO RELATED APPLICATIONS

This application is a continuation application of International Application PCT/JP2009/006888 filed on Dec. 15, 2009 and designated the U.S., the entire contents of which are incorporated herein by reference.

FIELD

The present invention relates to an integrated circuit power consumption calculating apparatus, processing method and program.

BACKGROUND

When power consumption of an integrated circuit such as an LSI (Large Scale Integrated circuit) or the like is obtained in a design phase, the following processes have been carried out.

Signal transition pattern information, obtained by executing a logic simulation process for an integrated circuit, of an input/output signal terminal of each of cells that configure the integrated circuit, cell power information, obtained by executing a circuit simulation process (such as SPICE: Simulation Program with Integrated Circuit Emphasis) for each cell, of each signal transition state of an input/output terminal, and inter-cell wiring information are obtained as input information of a power consumption calculation process.

Then, power consumption is obtained based on a signal transition of an input/output terminal of each cell, and a calculation of signal propagation to a cell at a succeeding stage and a power calculation of a load capacitance are performed based on the wiring information. A total of power is obtained by executing such a power calculation process for transition information of all signals of all circuits within the integrated circuit, so that power consumption of the entire integrated circuit is calculated.

There is one example of related techniques in which, when the power consumption of an integrated circuit including a large-scale circuit block (mega cell) such as an SRAM (Static Random Access Memory) macro or the like included in an LSI is calculated, power consumption of each state of an input terminal of each mega cell is obtained, and the power consumption of the mega cell and results of a logic simulation process are combined to calculate the power consumption of the integrated circuit.

There is another example of the related techniques, in which power consumption of each transition operation of basic circuits (basic cells) such as an inverter circuit (NOT circuit), an AND circuit, a NAND circuit, an OR circuit, a NOR circuit and the like, are obtained in advance and the number of transition operations of the basic circuits with a logic simulation is obtained to calculate power consumption of the entire integrated circuit from the power consumption of each transition operation and the number of transition operations based on of parameters of a predetermined logic circuit.

There is a further example of the related techniques, in which holding power consumption information of a circuit is held, and power consumed when an output of the circuit does not change and power consumed when the output of the circuit changes are obtained to obtain power consumption of a basic circuit based on a coefficient corresponding to the number of changes of the output per unit time according to a change of an input when the input of the circuit changes.

However, the related techniques do not take into account accuracy assurance in a power consumption calculation even if circuit complexity increases with a growing scale of a cell. This leads to a problem that the accuracy of a power consumption calculation of a cell is degraded when the whole of a large-scale circuit is designed as a transistor. Namely, with conventional techniques, it is needed to simulate operations of transistors collectively for the entire cell. However, if the number of input/output terminals of the cell becomes very large as in a 64-bit adder, the number of all combinations of states of inputs/outputs of the cell becomes enormous, leading to a very long time needed for the simulation process. Therefore, it is difficult to actually calculate power consumption of each transition state of an input/output signal.

Furthermore, if the number of transistors within a cell increases, a time needed for a circuit simulation process (such as a SPICE simulation process) of each transition state of an input/output signal becomes further long. Therefore, it is impossible to actually calculate power consumption with the circuit logic simulation process.

Still further, for a cell including many circuits for holding an internal state such as a latch array including a plurality of latches, its internal operation differs depending on a discrepancy of a held internal state even in the same input signal transition. Therefore, power consumption of the cell cannot be properly obtained only based on a transition state of an input/output signal.

There is a technique of obtaining power consumption of each state for a mega cell as one related technique. However, this technique obtains power consumption not by classifying all states within the mega cell but by respectively classifying states according to typical operations such as functions or the like. Therefore, this technique cannot detect a difference of power consumption, which is caused by a discrepancy among details of states within the mega cell, leading to a decrease in the accuracy of the power consumption calculation.

SUMMARY

An integrated circuit power consumption calculating apparatus disclosed as one embodiment of the present invention includes: an integrated circuit connection information storing unit configured to store integrated circuit connection information that indicates a connection relationship among circuits included in an integrated circuit; a transistor connection information storing unit configured to store transistor connection information that indicates a connection relationship among transistors included in each of cells that configure the integrated circuit; an input pattern information storing unit configured to store input pattern information that indicates a signal input pattern used for a logic simulation of the integrated circuit; a wiring information storing unit configured to store inter-cell wiring information that indicates wiring among the transistors of the integrated circuit; a circuit partitioning unit configured to identify, based on the transistor connection information, transistors as the same circuit component respectively for all the integrated circuit by collecting the transistors connected via a source terminal and a drain terminal of any of the transistors included in each of the cells of the integrated circuit, and to output circuit component transistor connection information that indicates a connection relationship among the transistors of each identified circuit component; a logic extracting unit configured to extract a logic for each of the circuit components from the circuit component transistor connection information, and to output circuit component logic model information that indicates the extracted logic of each of the circuit components; a power calculating unit configured to obtain, based on the circuit component transistor connection information, power information of each signal transition state of an input/output terminal for each of the circuit components, and to output circuit component power information that is power information of each of the circuit components; a logic simulating unit configured to generate signal terminal transition information that indicates a signal transition of an input/output terminal of each of the circuit components by performing a logic simulation for each of the circuit components of the integrated circuit based on the integrated circuit connection information, the input pattern information, and the circuit component logic model information; and an integrated circuit power consumption calculating unit configured to obtain power consumption of a signal transition of the input/output terminal of each of the circuit components based on the integrated circuit connection information, the signal terminal transition information, the circuit component logic model information and the circuit component power information, and to obtain power consumption of the integrated circuit based on the power consumption of each of the circuit components, which is obtained on the basis of the inter-cell wiring information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a configuration and a layout of transistors in one cell that configures an integrated circuit to be processed by the integrated circuit power consumption calculating apparatus in the embodiment;

FIG. 4 illustrates a logic model of the circuit components illustrated in FIG. 2;

FIG. 5 illustrates an example of a logic model of the circuit components of the cell illustrated in FIG. 3;

FIG. 8 illustrates an example of transistor connection information of a cell in the integrated circuit illustrated in FIG. 6;

FIG. 9 illustrates an example of transistor connection information of circuit components in the integrated circuit illustrated in FIG. 6;

FIG. 10 illustrates an example of logic model information of circuit components in the integrated circuit illustrated in FIG. 6;

FIG. 11 illustrates an example of power information of the circuit components in the integrated circuit illustrated in FIG. 6;

FIG. 13 illustrates an example of signal terminal transition information collected with the logic simulation in the integrated circuit illustrated in FIG. 6;

FIG. 14 illustrates an example of information indicating power consumption of wiring between cells in the integrated circuit illustrated in FIG. 6;

FIG. 15 illustrates an example of integrated circuit power consumption information of the integrated circuit illustrated in FIG. 6;

FIG. 17 is an explanatory view of applying results, output by the integrated circuit power consumption calculating apparatus, of a power consumption calculation in units of circuit components in the integrated circuit to a study of improving a design.

DESCRIPTION OF EMBODIMENT

Figure 1:
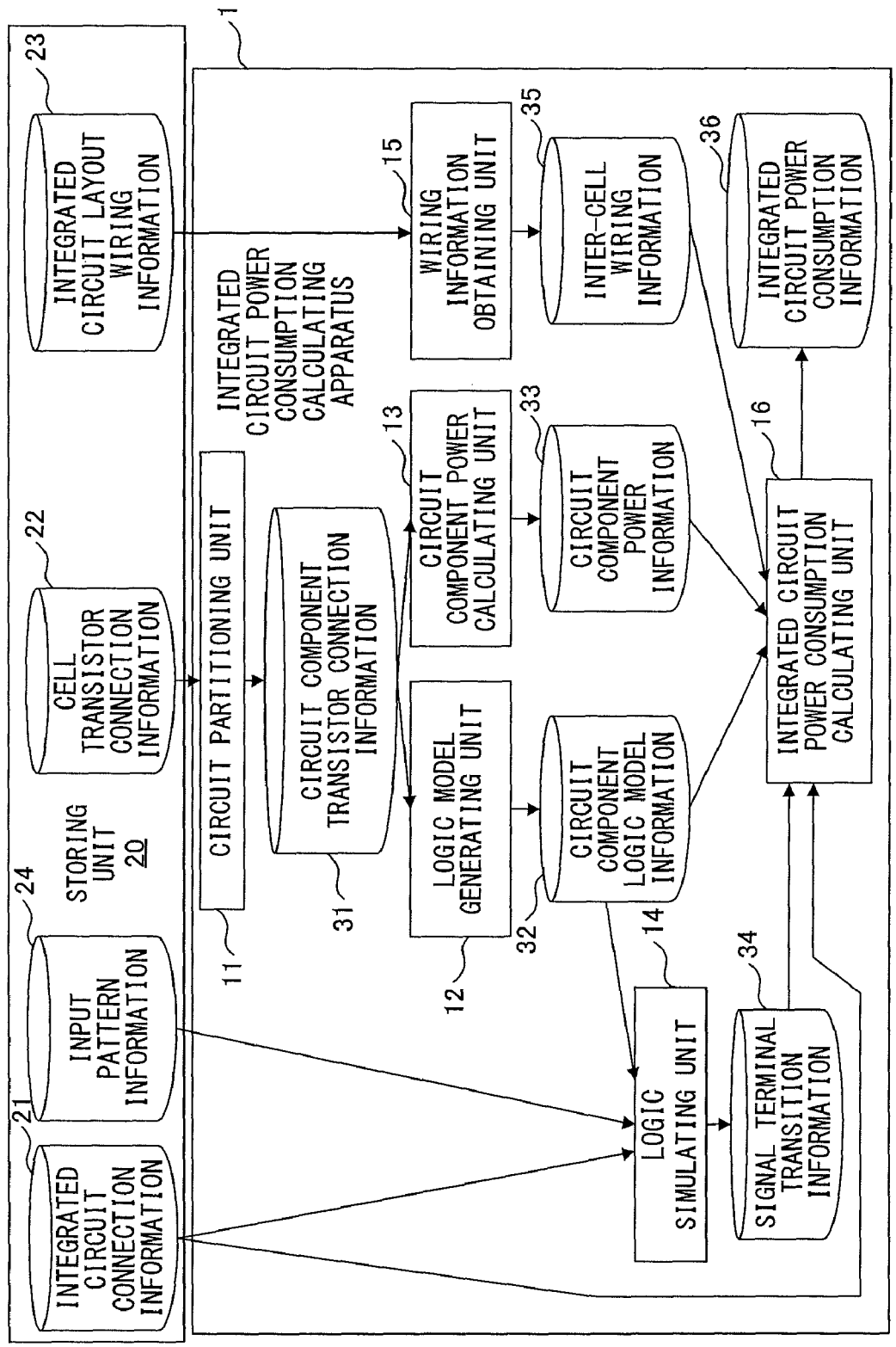
FIG. 1 illustrates an example of a configuration of an integrated circuit power consumption calculating apparatus disclosed as one embodiment.

FIG. 1 illustrates an example of a configuration of an integrated circuit power consumption calculating apparatus disclosed as one embodiment.

The integrated circuit power consumption calculating apparatus 1 is an apparatus for calculating power consumption of an integrated circuit. The integrated circuit power consumption calculating apparatus 1 includes a circuit partitioning unit 11, a logic model generating unit 12, a circuit component power calculating unit 13, a logic simulating unit 14, a wiring information obtaining unit 15, an integrated circuit power consumption calculating unit 16 and a storing unit 20.

The storing unit 20 stores integrated circuit connection information 21, cell transistor connection information 22, integrated circuit layout wiring information 23 and input pattern information 24.

The integrated circuit connection information 21 is information that indicates circuits configuring an integrated circuit, and a connection relationship among the circuits. The integrated circuit connection information 21 describes, for each circuit, a circuit type, a form, an input terminal, an output terminal, a signal line (net) to which a terminal is connected, and other items of information. In this embodiment, the integrated circuit connection information 21 is, for example, a netlist of an integrated circuit to be processed.

The cell transistor connection information 22 is information that indicates transistors such as a MOS-FET (Metal Oxide Semiconductor Field Effect Transistor) and the like included in each cell of the integrated circuit, and a connection relationship among the transistors.

The cell transistor connection information 22 describes a transistor name, a model name, a node, a shape, transistor parameters, a connection relationship and the like of each of the transistors. In this embodiment, the cell transistor connection information 22 is, for example, a transistor netlist that is circuit connection information within each cell of the integrated circuit.

To ensure the accuracy of a power calculation process, it is preferable that the cell transistor connection information 22 is a netlist obtained by extracting a layout to which a parasitic RC that is a time constant calculated based on a parasitic resistance component R (Resistance) and a parasitic capacitance component C (Capacitance) is added. However, if a power consumption calculation (power consumption estimation) is performed before the layout process, a netlist generated from a circuit diagram that does not include a parasitic RC can be used as the cell transistor connection information 22.

The integrated circuit layout wiring information 23 is information that indicates an actual layout and wiring of components and the like included in the integrated circuit. In this embodiment, the integrated circuit layout wiring information 23 is information output by a CAD (Computer Aided Design) system. Further, the integrated circuit layout wiring information 23 may be information that accompanies an integrated circuit netlist equivalent to the integrated circuit connection information 21.

The input pattern information 24 is information that indicates a transition pattern of a signal to an input terminal in each circuit for a logic simulation of the integrated circuit. It is more preferable that the input pattern information 24 is information intended for a simulation of a program operation that maximizes the power consumption of the integrated circuit.

The circuit partitioning unit 11 identifies, for each cell of the integrated circuit, transistors within each cell as the same circuit component by collecting the transistors connected with a signal line (internal net) via a source terminal or a drain terminal based on the cell transistor connection information 22, and outputs circuit component transistor connection information 31 that indicates a connection relationship among transistors of each circuit component. The circuit component transistor connection information 31 is a netlist of transistors of a circuit component, which is generated from the cell transistor connection information 22.

Additionally, if a cell includes a latch array for holding a predetermined logic state, the circuit partitioning unit 11 identifies, as one circuit component, circuits that configure a loop for holding the logic state by further collecting the circuits.

The logic model generating unit 12 extracts a logic for each circuit component from the circuit component transistor connection information 31, and outputs circuit component logic model information 32 that describes the extracted logic model of the circuit component.

The circuit component power calculating unit 13 obtains, for each circuit component, a power value of each signal transition state of an input/output terminal of the circuit component based on the circuit component transition connection information 31, and outputs circuit component power information 33 that is power information of each circuit component.

The logic simulating unit 14 generates signal terminal transition information 34 that indicates a signal transition of an input/output terminal of each circuit component by performing a logic simulation for each circuit component of the integrated circuit based on the integrated circuit connection information 21, the input pattern information 24 and the circuit component logic model information 32.

The wiring information obtaining unit 15 extracts, from the integrated circuit layout wiring information 23, inter-cell wiring information 35 about wiring between cells of the integrated circuit.

The integrated circuit power consumption calculating unit 16 obtains power consumption of each circuit component by calculating, for each circuit component, power consumption in a signal transition state of an input/output terminal of the signal terminal transition information 34 based on the integrated circuit connection information 21, the signal terminal transition information 34, the circuit component logic model information 32 and the circuit component power information 33, and by obtaining and adding a load capacitance of wiring member(s) between cells based on the inter-cell wiring information 35. The integrated circuit power consumption calculating unit 16 accumulates the power consumption of all circuit components of the integrated circuit, and outputs integrated circuit power consumption information 36 that indicates the power consumption of the entire integrated circuit.

Operations of the integrated circuit power consumption calculating apparatus 1 are described below.

The integrated circuit power consumption calculating apparatus 1 obtains the integrated circuit connection information 21, the cell transistor connection information 22, the integrated circuit layout wiring information 23 and the input pattern information 24 in advance, and stores these items of information in the storing unit 20.

FIG. 2 illustrates a configuration and a layout of transistors in one cell that configures an integrated circuit to be processed by the integrated circuit power consumption calculating apparatus 1.

The cell illustrated in FIG. 2 has four input terminals (A1, A2, A3, A4) and one output terminal (X), and is configured with 12 transistors (t1 to t12). The cell also includes 10 internal nets (n1 to n1) inclusive of connection nets to the input/output terminals.

[Circuit Partitioning Process]

The circuit partitioning unit 11 integrates transistors which are connected via a source terminal and a drain terminal into the same circuit component by tracing internal nets other than power and ground nets, and separates transistors that are not included in the same circuit component as another circuit component. If a transistor is connected via a resistor, the circuit partitioning unit 11 regards the resistor also as wiring member, and partitions the resistor as a circuit component.

In the cell illustrated in FIG. 2, the internal nets n1 n2, n6 and n7 in the cell illustrated in FIG. 2 are connected neither to a source terminal nor a drain terminal. Therefore, the circuit partitioning unit 11 does not regard the internal nets n1, n2, n6 and n7 as targets of the partition process as a circuit component.

In the cell illustrated in FIG. 2, the internal net n3 is connected to drain terminals of the transistors t1, t2 and t3. Therefore, the circuit partitioning unit 11 sets the transistors t1, t2 and t3 as the same circuit component. Moreover, the internal net n8 is connected to a source terminal of the transistor t3 and a drain terminal of the transistor t4. The circuit partitioning unit 11 therefore sets the transistors t3 and t4 as the same circuit component. Then, the circuit partitioning unit 11 sets the transistors t1, t2, t3 and t4 as the same circuit component based on the above described results of the circuit partitioning. In FIG. 2, a range of each of the circuit components is indicated as a dashed-line circular area.

Additionally, the internal net n4 is connected to drain terminals of the transistors t5, t6, and t7. Therefore, the transistors t5, t6 and t7 are set as the same circuit component. Moreover, the internal net n9 is connected to a source terminal of the transistor t7 and a drain terminal of the transistor t8. Therefore, the circuit partitioning unit 11 sets the transistors t7 and t8 as the same circuit component. Similarly, the circuit partitioning unit 11 sets the transistors t5, t6, t7 and t8 as the same circuit component based on the above described results of the circuit partitioning.

Similarly, the internal net n5 is connected to drain terminals of the transistors t9, t10 and t11. Therefore, the circuit partitioning unit 11 sets the transistors t9, t10 and t11 as the same circuit component. Moreover, the internal net n10 is connected to a source terminal of the transistor t11 and a drain terminal of the transistor t12. The circuit partitioning unit 11 therefore sets the transistors t11 and t12 as the same circuit component.

Lastly, the circuit partitioning unit 11 sets the transistors t9, t10, t11 and t12 as the same circuit component based on the above described results of the circuit partitioning.

In this way, the cell illustrated in FIG. 2 is partitioned into a total of three circuit components such as the circuit component #1 configured by the transistors t1, t2, t3 and t4, the circuit component #2 configured by the transistors t5, t6, t7 and t8, and the circuit component #3 configured by the transistors t9, t10, t11 and t12.

Figure 3:
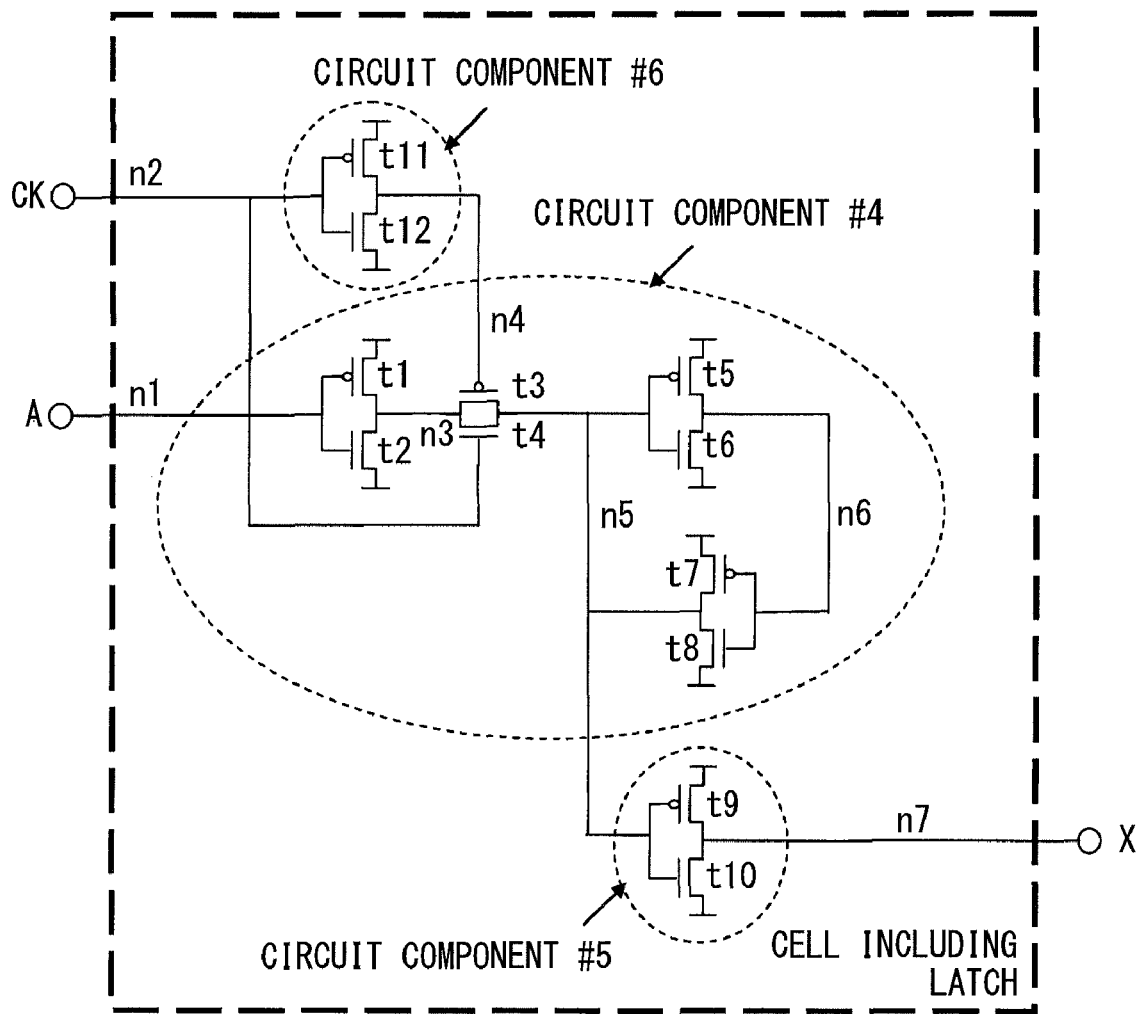
FIG. 3 illustrates a configuration and a layout of transistors in a cell that configures an integrated circuit to be processed and includes a latch circuit in the embodiment.

FIG. 3 illustrates a configuration and a layout of transistors in a cell that configures an integrated circuit to be processed and includes a latch circuit.

The cell illustrated in FIG. 3 has two input terminals A, a clock input terminal CK and one output terminal X, and is configured with 12 transistors t1 to t12. This cell also includes seven internal nets (n1 to n7) inclusive of connection nets to the input/output terminals.

Similarly to the process described with reference to FIG. 2, the circuit partitioning unit 11 identifies (sets) transistors, source terminals or drain terminals of which are connected each other, as the same circuit component by tracing the internal nets within the cell. The circuit partitioning unit 11 also sets a transistor connected whose source terminal or drain terminal are connected to a drain terminal or a source terminal of another transistor within the same circuit component as one included in the same circuit component.

Additionally, if the cell includes a latch circuit, the circuit partitioning unit 11 detects a loop for holding a logic state, and collects the loop portion to a portion of the same circuit component.

In the cell illustrated in FIG. 3, the internal nets n1 and n2 are connected to neither a source terminal nor a drain terminal of the transistors. Therefore, the circuit partitioning unit 11 does not regard these nets as ones being in targets of the circuit partitioning process.

The internal net n3 is connected to drain terminals of the transistors t1 and t2, and source terminals of the transistors t3 and t4. The circuit partitioning unit 11 therefore sets the transistors t1, t2, t3 and t4 as ones being in the same circuit component.

Additionally, the internal net n5 is connected to drain terminals of the transistors t3, t4, t7 and t8. The circuit partitioning unit 11 therefore sets the transistors t3, t4, t7 and t8 as the same circuit component. The circuit partitioning unit 11 sets the transistors t1, t2, t3, t4, t7 and t8 as ones being in the same circuit component based on the above described results of the circuit partitioning.

Furthermore, the internal net n6 is connected to drain terminals of the transistors t5 and t6. Therefore, the circuit partitioning unit 11 sets the transistors t5 and t6 as ones being in the same circuit component.

Here, the internal net n5 and the internal net n6 logically form a loop. Therefore, the circuit partitioning unit 11 collects the transistors t1, t2, t3, t4, t7 and t8 of the circuit component connected to the internal net n5, and the transistors t5 and t6 of the circuit component connected to the internal net n6 as ones being in the same circuit component #4.

Additionally, the internal net n4 is connected to drain terminals of the transistors t11 and t12. Therefore, the circuit partitioning unit 11 sets the transistors t11 and t12 as ones being in the same circuit component #6. Moreover, the internal net n7 is connected to drain terminals of the transistors t9 and 10. The circuit partitioning unit 11 therefore sets the transistors t9 and t10 as ones being in the same circuit component #5.

In this way, the cell that is illustrated in FIG. 3 and includes the latch circuit is partitioned into a total of three circuit components such as the circuit component #4 configured by the transistors t1, t2, t3, t4, t5, t6, t7 and t8, the circuit component #5 configured by the transistors t9 and t10, and the circuit component #6 configured by the transistors t11 and t12.

The circuit partitioning unit 11 may perform circuit partitioning with another processing method (second partitioning processing method) other than the above described processing method (first partitioning processing method) of partitioning a cell into circuit components by tracing a connection among transistors based on an internal net of the cell.

The circuit partitioning unit 11 can also partition a cell into circuit components by detecting a transistor circuit that matches a configuration in definition information from transistor connection information of a cell by using, as an input, the definition information of the configuration of a transistor circuit to be set as one being in the same circuit component within the cell.

If this processing method is executed, the circuit partitioning unit 11 initially holds circuit component definition information that defines a transistor circuit configuration of a 2-input NAND circuit. Assume that the transistor circuit configuration of the 2-input NAND circuit is the same as that within the dashed-line circular area in the cell illustrated in FIG. 2. The circuit partitioning unit 11 examines whether or not a transistor circuit that has the same configuration as that defined in the definition information exists in transistor connection information of the cell illustrated in FIG. 2 based on this definition information. If the transistor circuit having the same configuration as that in the definition information is detected, the configuration of the transistor in the detected portion is extracted as a circuit component. In the cell illustrated in FIG. 2, three portions of the transistor configuration, which match the configuration of the transistor circuit in the definition information, can be detected. Therefore, the detected portions are extracted as three circuit components #1, #2 and #3.

The circuit partitioning unit 11 can partition a cell by using both the first partitioning processing method and the second partitioning processing method. The circuit partitioning of a cell may be completed by extracting a circuit component from a cell with the second partitioning processing method and by executing the first partitioning processing method for a remaining transistor group.

[Circuit Component Logic Extraction Process]

Next, the logic model generating unit 12 extracts a logic of a circuit component.

The logic model generating unit 12 extracts a logic operation in units of circuit components based on the circuit component transistor connection information 31, and creates circuit component logic model information 32 that describes a logic operation of each circuit component.

FIG. 4 illustrates a logic model of the circuit components of the cell illustrated in FIG. 2.

The logic model generating unit 12 outputs a logic model (nand1) where the circuit component #1 (transistors t1, t2, t3, t4) of the cell illustrated in FIG. 2 is a nand logic circuit, its inputs are connected to the input terminals A1 and A2, and its output is connected to the circuit component #2 (transistors t5, t6, t7, t8).

The logic model generating unit 12 also outputs a logic model (nand3) where the circuit component #3 (transistors t9, t10, t11, t12) illustrated in FIG. 2 is a nand logic circuit, its inputs are connected to the input terminals A3 and A4, and its output is connected to the circuit component #2 (transistors t5, t6, t7, t8).

The logic model generating unit 12 further outputs a logic model (nand2) where the circuit component #2 (transistors t5, t6, t7, t8) is a nand logic circuit, its inputs are connected to the circuit component #1 (transistor t1, t2, t3, t4) and the circuit component #3 (transistors t9, t10, t11, t12), and its output is connected to an output terminal X.

Additionally, the logic model generating unit 12 similarly extracts a logic operation for the circuit components of the cell illustrated in FIG. 3.

FIG. 5 illustrates an example of a logic model of the circuit components of the cell illustrated in FIG. 3.

The logic model generating unit 12 outputs a logic model (latch1) where the circuit component #4 (transistors t1, t2, t3, t4, t5, 56, t7, t8) illustrated in FIG. 3 is a latch, its input is connected to the input terminal A, and its output is connected to the circuit component #6.

The logic model generating unit 12 also outputs a logic model (inverter2) where the circuit component #5 (transistors t9, t10) illustrated in FIG. 3 is an inverter, its input is connected to the input terminal CK, and its output is connected to the circuit component #4.

The logic model generating unit 12 further outputs a logic model (inverter1) where the circuit component #6 (transistors t11, t12) illustrated in FIG. 3 is an inverter, an input is connected to the circuit component #4, and an output is connected to the output terminal X.

[Circuit Component Power Calculation Process]

Furthermore, the circuit component power calculating unit 13 calculates power of a circuit component.

The circuit component power calculating unit 13 calculates, for each circuit component partitioned from a cell, a power value of a circuit component in each input/output signal transition state of the circuit component based on the circuit component transistor connection information 31. For example, the cell illustrated in FIG. 2 is partitioned into the three circuit components #1, #2 and #3. Accordingly, the number of patterns needed for the power value calculation process in each of the input/output signal transition states results in > the number of patterns 2 (up/down) that change a signal×the number of combinations of fixed signals of unchanged pin 2 (0/1 of 1 pin)×the number of pins 2 (2 pins) that change a signal×the number of circuit components 3 (nand1,nand2,nand3)=24 patterns With a conventional method for the calculation process of the power value of the cell illustrated in FIG. 2, the number of patterns needed to calculate the power of the cell when only one of the four input terminals is changed is as follows.

> the number of patterns 2 (up/down) that change a signal×the number of combinations of fixed signals of unchanged pins 8 (0/1 of 3 pins)×the number of pins 4 (A1,A2,A3,A4) that change a signal=64 patterns

[Logic Simulation Process]

Next, the logic simulating unit 14 performs a logic simulation for the integrated circuit.

The logic simulating unit 14 collects information that indicates a signal transition state of an input/output terminal of each circuit component by executing a known SPICE simulation process as a logic simulation process based on the input pattern information 24 on the basis of a logic model of each circuit component obtained by partitioning each cell of the integrated circuit into circuit components.

The logic simulating unit 14 performs a logic simulation for the cell illustrated in FIG. 4 by using a logic model of each circuit component within the cell illustrated in FIG. 4. Therefore, the logic simulating unit 14 collects information at each input/output terminal of the circuit components #1, #2 and #3 connected to the internal nets n3 and n5 of the cell. As a result, the signal terminal transition information 34 that indicates a signal transition at each input/output terminal of the circuit components #1 (nand1), #2 (nand2) and #3 (nand3) is obtained.

With the conventional logic simulation process in units of cells, the input/output signal transition information is collected only at the input terminals A1, A2, A3 and A4 and the output terminal X.

In a logic model handled by the logic simulating unit 14, the amount of data to be input to the logic simulation process is expected to increase in comparison with a logic model in units of cells. Accordingly, it is sometimes needed to take, into account, creation of a logic model for a power consumption calculation of an integrated circuit separately from a logic model for logic verification.

[Inter-Cell Wiring Information Obtainment Process]

The wiring information obtaining unit 15 obtains, from the integrated circuit layout wiring information 23, inter-cell wiring information 35 that indicates a length and the like of a signal line (inter-cell wiring member) that connects cells configuring an integrated circuit by executing a known inter-cell wiring information extraction process.

[Integrated Circuit Power Consumption Process]

Next, the integrated circuit power consumption calculating unit 16 outputs integrated circuit power consumption information 36 by executing a known power consumption calculation process that uses, as inputs, the integrated circuit connection information 21, the circuit component logic model information 32, the circuit component power information 33, the signal terminal transition information 34 and the inter-cell wiring information 35.

The integrated circuit power consumption calculating unit 16 fundamentally obtains the power consumption of an integrated circuit similarly to a known power consumption calculation.

Initially, the integrated circuit power consumption calculating unit 16 obtains, for each cell of an integrated circuit, power consumption of each circuit component type in the first operation cycle based on a signal transition state of an input/output terminal, which is obtained in each circuit component, with reference to power consumption of a corresponding signal state of a circuit component within the circuit component power information 33. The integrated circuit power consumption calculating unit 16 calculates a capacitance of wiring member(s) among circuit components as a capacitance of wiring member(s) among circuit components within the cell, and adds the calculated capacitance as power consumption on the output side of the circuit component.

Then, the integrated circuit power consumption calculating unit 16 calculates power consumption respectively for all circuit components within the cell.

Next, the integrated circuit power consumption calculating unit 16 obtains a capacitance of inter-cell wiring member(s) from the inter-cell wiring information 35, and adds power consumption of inter-cell wiring member(s) to the power consumption of the cell, which is obtained with the above described calculation process.

The integrated circuit power consumption calculating unit 16 calculates power consumption in units of cells for all the cells that configure the integrated circuit, totals the power consumption obtained respectively for the cells, and obtains the power consumption of the integrated circuit in the first operation cycle.

The integrated circuit power consumption calculating unit 16 repeatedly executes the obtainment process for the power consumption of the integrated circuit in each operation cycle based on the signal terminal transition information 34 obtained with the logic simulation process of the logic circuit. Then, the integrated circuit power consumption calculating unit 16 obtains the power consumption of the integrated circuit in all operation cycles by accumulating the power consumption of the integrated circuit, which is obtained in the operation cycles, and outputs the obtained power consumption as the integrated circuit power consumption information 36.

Power consumption even within a large-scale cell can be obtained respectively for operations of individually partitioned circuit components in this way, whereby results of the power consumption calculation can be obtained with high accuracy.

A more specific implementation example of the process of the integrated circuit power consumption calculating apparatus 1 is described below.

Figure 6:
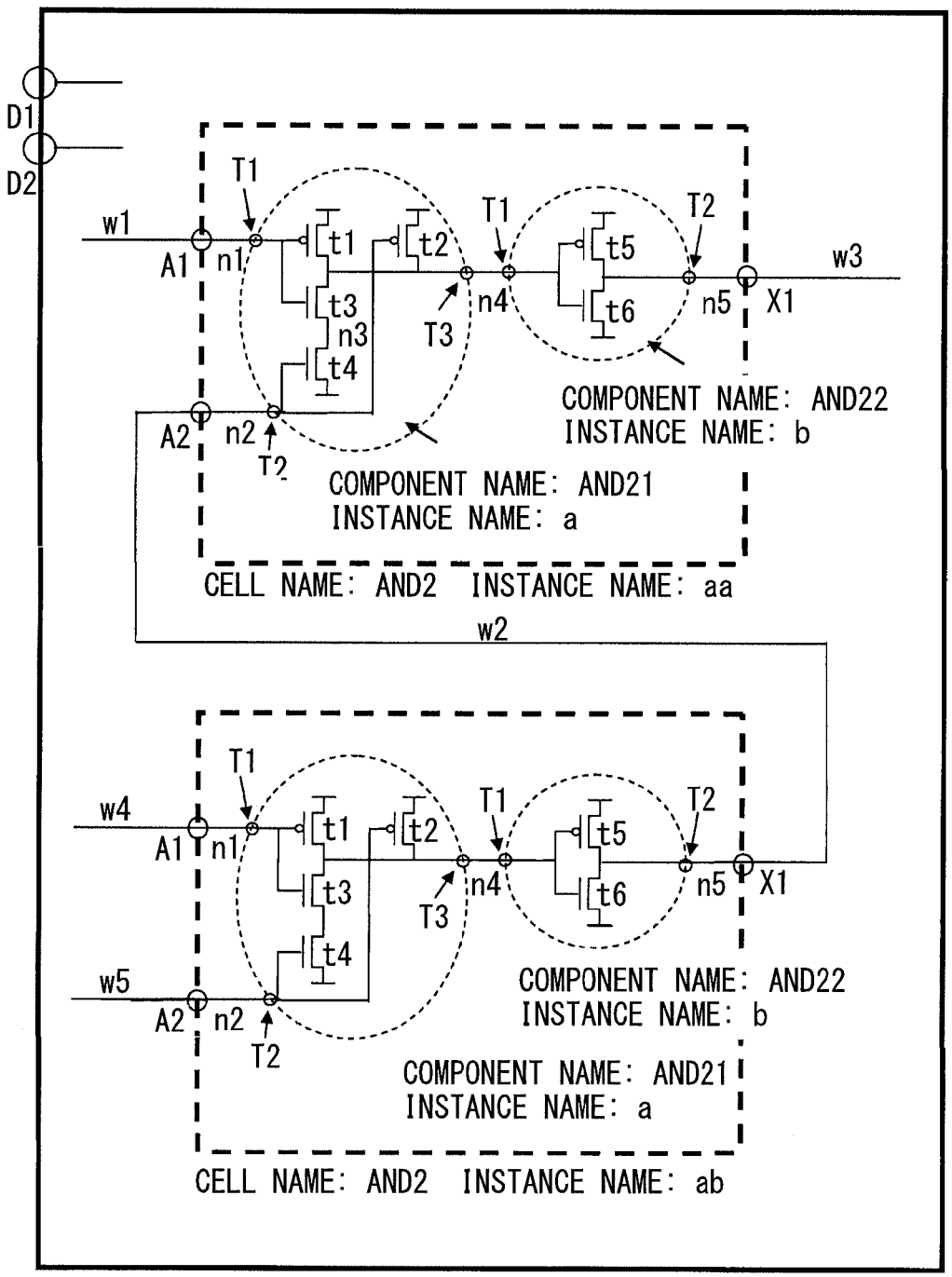
FIG. 6 illustrates an example of a configuration of a cell of the integrated circuit to be processed by the integrated circuit power consumption calculating apparatus, and a configuration of transistors within the cell.

FIG. 6 illustrates an example of a configuration of cells of an integrated circuit to be processed by the integrated circuit power consumption calculating apparatus 1, and a configuration of transistors within each of the cells.

Assume that the integrated circuit power consumption calculating apparatus 1 executes a power calculation process for two cells that are included in an integrated circuit LSI#1 illustrated in FIG. 6 and have the same transistor configuration.

The two cells of the integrated circuit LSI#1 illustrated in FIG. 6 have the same transistor configuration, and are respectively configured with two input terminals A1, A2, one output terminal X1, and six transistors t1 to t6. The two cells also include five internal nets (n1 to n5) inclusive of connection nets to the input/output terminals.

The integrated circuit LSI#1 has five nets (w1 to w5) inclusive of signal lines connected to the input terminals D1 and D2.

Figure 7:
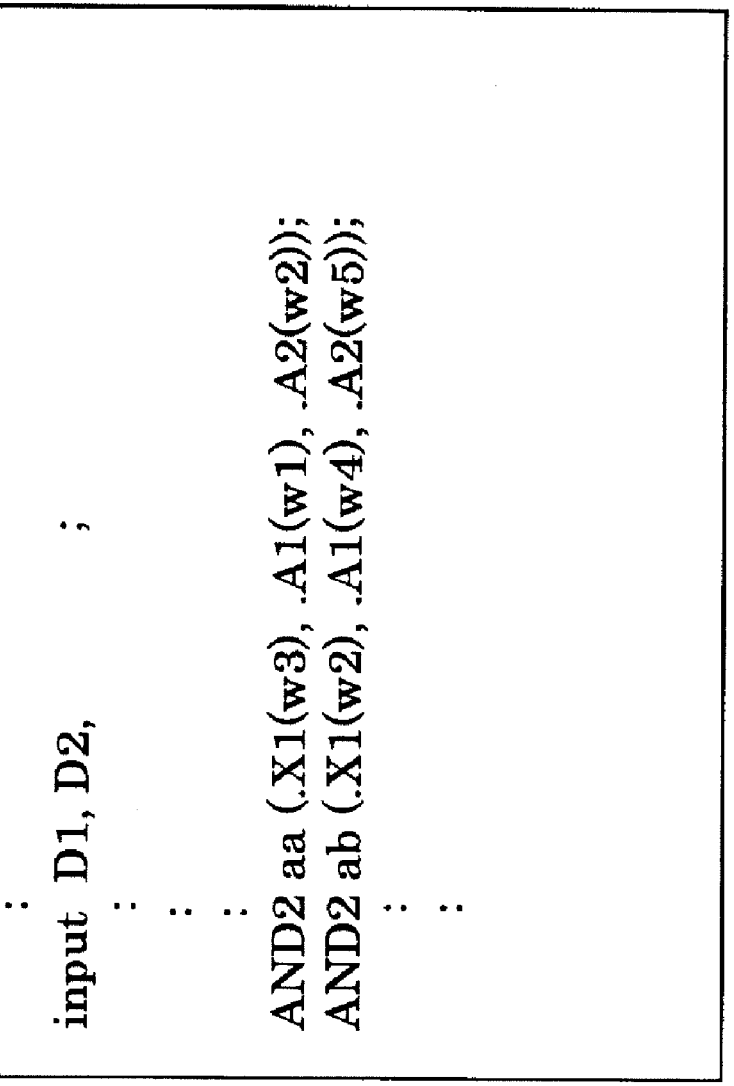
FIG. 7 illustrates an example of integrated circuit connection information of the integrated circuit illustrated in FIG. 6.

FIG. 7 illustrates an example of the integrated circuit connection information 21 in the integrated circuit LSI#1 illustrated in FIG. 6. The integrated circuit connection information 21 illustrated in FIG. 7 is based on a description of a netlist, and part of a data description.

The description example illustrated in FIG. 7 represents that the integrated circuit LSI#1 has two input terminals D1 and D2, and two cells (cell name: AND2).

An output terminal X1, an input terminal A1 and an input terminal A2 of one cell (instance name aa) are respectively connected to a net w3, a net w1 and a net w2. In contrast, an output terminal X1, an input terminal A1, and an input terminal A2 of the other cell (instance name ab) are respectively connected to the net w2, a net w4 and a net w5.

FIG. 8 illustrates an example of the cell transistor connection information 22 in the integrated circuit LSI#1 illustrated in FIG. 6. The cell transistor connection information 22 illustrated in FIG. 8 is based on a description of a netlist, and part of a data description.

The cell transistor connection information 22 describes an input terminal, an output terminal, an internal transistor, and information of a transistor (a transistor element name, a terminal node name, a transistor model name, transistor parameters (such as a gate width, a gate length and the like) of the cell (AND2) of the integrated circuit LSI#1 illustrated in FIG. 6. The terminal node name is described so that a connection destination of a transistor is included.

The description example of FIG. 8 represents that the cell AND2 has one output terminal X1, two input terminals A1 and A2, and six transistors t1 to t6. This example also represents that a transistor element name (mt1), a terminal node name (n4 A1 VDD VSS), a transistor model name (pch), transistor parameters (W=1 u, L=0.1 u) and the like are described for one transistor t1. It is proved from this description that the terminal of the transistor t1 is connected to the input terminal A1 and the internal net n4.

The circuit partitioning unit 11 partitions the transistors t1 to t6 of each cell of the integrated circuit LSI#1 into circuit components based on the cell transistor connection information 22 illustrated in FIG. 8.

The circuit partitioning unit 11 sets the transistors t1, t3, t4 and t2 of the cell "AND2;aa" as one circuit component "component name: AND21, instance name: a". Similarly, the circuit partitioning unit 11 sets the transistors t5 and t6 of the cell "AND2; aa" as one circuit component "component name: AND22, instance name; b". The circuit partitioning unit 11 similarly partitions the cell "AND2;ab" into circuit components.

In the configuration example of the integrated circuit LSI#1 illustrated in FIG. 6, the circuit components are respectively represented as portions indicated with a dashed-line ellipse.

The circuit partitioning unit 11 partitions the cell into circuit components, and outputs circuit component transistor connection information 31.

FIG. 9 illustrates an example of the circuit component transistor connection information 31 in the integrated circuit LSI#1 illustrated in FIG. 6. The circuit component transistor connection information 31 illustrated in FIG. 9 is based on a description of a netlist, and part of a data description.

In the description example illustrated in FIG. 9, connection information of transistors of the circuit components AND21 and AND22 within the cell is defined.

This examples represents that, for instance, the circuit component "AND21" has two input terminals T1 and T2, one output terminal T3, and four transistors t1, t2, t3 and t4. This example also represents that the transistor t1 has a transistor element name (t1), terminal node names (T3 T1 VDD VDD), a transistor model name (pch), transistor parameters (W=1 u, L=0.1 u and the like. It is proved from this example that the terminals of the transistor t1 are connected to the input terminal T1 and the output terminal T3.

This example further represents that the circuit component "AND 22" has one input terminal T1, one output terminal T2, and two transistors t5 and t6. This example also represents that the transistor t5 has a transistor element name (t5), terminal node names (T2 T1 VDD VDD), a transistor model name (pch), transistor parameters (W=1 u, L=0.1 u) and the like. It is proved from this example that the terminals of the transistor t5 are connected to the input terminal T1 and the output terminal T2.

The logic model generating unit 12 extracts a logic of each of the circuit components based on the circuit component transistor connection information 31 illustrated in FIG. 9, and outputs circuit component logic model information 32.

FIG. 10 illustrates an example of the circuit component logic model information 32 in the integrated circuit LSI#1 illustrated in FIG. 6.

The circuit component logic model information 32 describes a logic model of cells of the integrated circuit LSI#1, and circuit components that respectively configure the cells. The circuit component logic model information 32 illustrated in FIG. 10 is part of a data description.

The description example illustrated in FIG. 10 represents a logic description of the cell AND2, a logic description (nand gate) of the circuit component AND21 that configures the cell AND2, and a logic description (inverter) of the circuit component AND22 that also configures the cell AND2.

Additionally, the circuit component power calculating unit 13 obtains power consumption of each input/output signal transition for each circuit component based on the circuit component transistor connection information 31 illustrated in FIG. 9, calculates power consumption of each circuit component, and outputs the circuit component power information 33.

FIG. 11 illustrates an example of the circuit component power information 33 of the integrated circuit LSI#1 illustrated in FIG. 6.

The circuit component power information 33 describes, as power information of each circuit component, a leakage power value, capacitances at rising/falling of a terminal, one or a plurality of output load capacitances, and a power value of a cell, which corresponds to an output load capacitance, as power consumed at the time of a signal change at each terminal.

The description example illustrated in FIG. 11 describes, as power information of the circuit component AND21, a leakage power value=23.4668, capacitances=0.0160647/0.0160716 at the rising/falling of the input terminal T1 of the circuit component AND21, a cell power value=0.0019 in the case of an output load capacitance=0.0032 as power consumed at the time of a signal change at the input terminal T1.

This description example also describes, as power information of the circuit component AND22, a leakage power value=22.6677, a cell power value=0.0016 in the case of an output load capacitance=0.001, a cell power value=0.0032 in the case of an output load capacitance=0.003, a cell power value=0.0067 in the case of an output load capacitance=0.01, a cell power value=0.0121 in the case of an output load capacitance=0.03, a cell power value=0.0245 in the case of an output load capacitance=0.1, and a cell power value=0.0517 in the case of an output load capacitance=0.3 as power consumed at the time of a signal change at the input terminal T1 of the circuit component AND22.

The logic simulating unit 14 performs a logic simulation for the integrated circuit LSI#1 based on the integrated circuit connection information 21 (see FIG. 7), the input pattern information 24 and the circuit component logic model information 32 (see FIG. 10).

Figure 12:
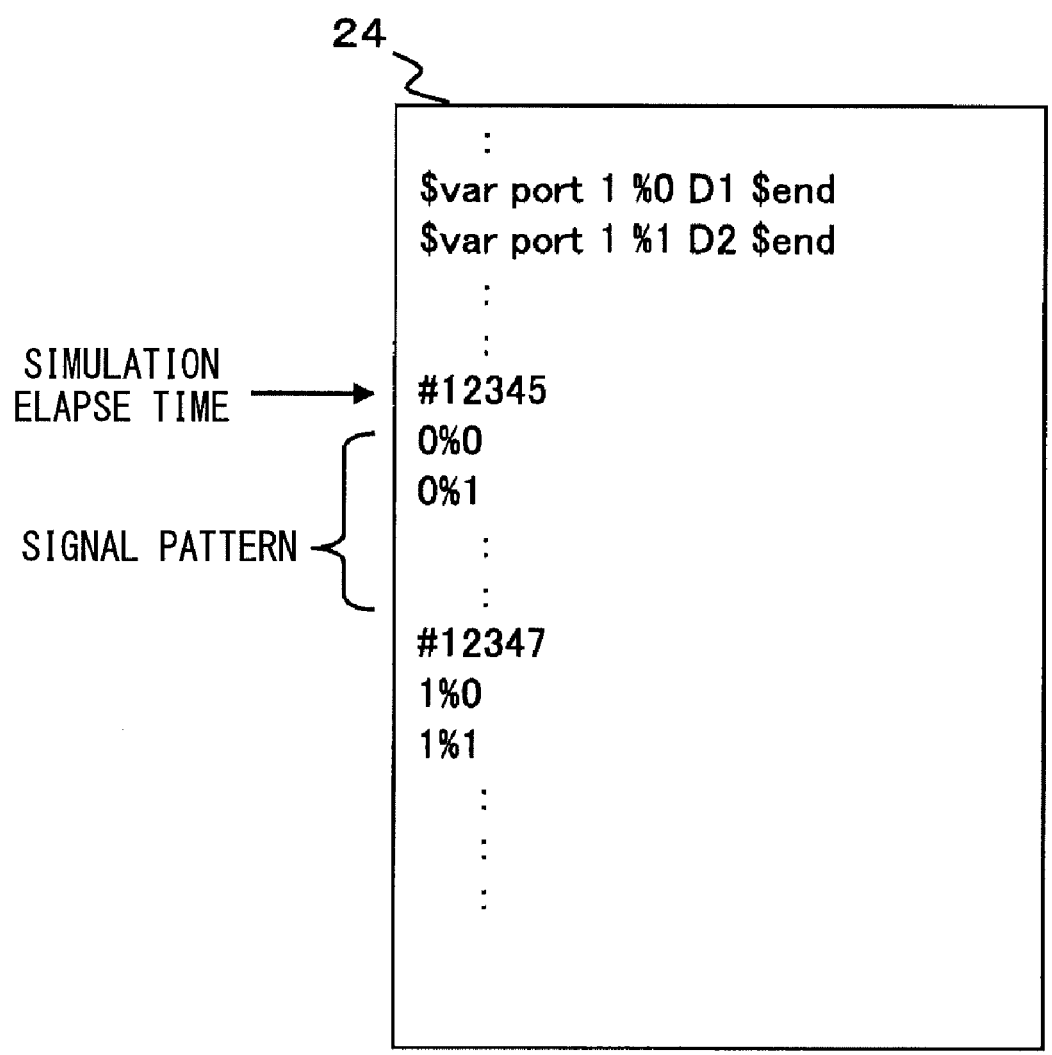
FIG. 12 illustrates an example of input pattern information for a logic simulation of the integrated circuit illustrated in FIG. 6.

FIG. 12 illustrates an example of the input pattern information 24 for the logic simulation of the integrated circuit LSI#1 illustrated in FIG. 6.

The input pattern information 24 illustrated in FIG. 12 describes signal inputs to the input terminals D1 and D2 of the integrated circuit LSI#1 in each operation cycle.

The description example illustrated in FIG. 12 represents that a value of the input terminal D1 (%0) and that of the input terminal D2 (%1) are set to "0" at a time #12345, which indicates an elapse time of the logic simulation and corresponds to an operation cycle, and the value of the input terminal D1 (%0) and that of the input terminal D2 (%1) are set to "1" at a subsequent time=#12347.

The logic simulating unit 14 collects signals of input/output terminals of each circuit component based on a signal input pattern described in the input pattern information 24, and outputs signal terminal transition information 34 that indicates a signal transition at each terminal.

FIG. 13 illustrates an example of the signal terminal transition information 34 collected with the logic simulation performed for the integrated circuit LSI#1 illustrated in FIG. 6.

The signal terminal transition information 34 describes terminals (information collection points) where a signal transition is collected after a cell is partitioned into circuit components, and a transition state of a signal at each of the information collection points at a simulation elapse time in the logic simulation process.

The example of FIG. 13 represents that point %2=terminal X1, point %3=terminal T1 of a circuit component a, point %4=terminal T2 of the circuit component a, point %5=terminal T3 of the circuit component a, point %6=terminal T1 of the circuit component b, and point %7=terminal T2 of a circuit component b are set.

This example also represents that signals at the information collection points %2 to %7 at a simulation elapse time (#12345) are point %2:1, point %3:1, point %4:1, point %5:0, point %6:0, and point %7:1. This example further represents that signals at the information collection points %2 to %7 are point %2:0, point %3:0, point %4:0, point %5:1, point %6:1, and point %7:0.

The integrated circuit power consumption calculating unit 16 calculates the power consumption of the integrated circuit LSI#1 based on the integrated circuit connection information 21 (see FIG. 7), the circuit component logic model information 32 (see FIG. 10), the circuit component power information 33 (see FIG. 11), and the signal terminal transition information 34 (see FIG. 13), and outputs integrated circuit power consumption information 36 resulting from the calculation.

The integrated circuit power consumption calculating unit 16 obtains a capacitance of inter-cell wiring member(s) based on the inter-cell wiring information 35. Then, the integrated circuit power consumption calculating unit 16 obtains power consumption of the cell AND2 by obtaining power consumption of a circuit component based on the power information of a circuit type and the capacitance of inter-cell wiring member(s) on the basis of the signal transition state of an input/output terminal of the circuit components AND21 and AND22.

FIG. 14 illustrates an example of information that indicates the capacitance of inter-cell wiring member(s) in the integrated circuit LSI#1 illustrated in FIG. 6. In the information example illustrated in FIG. 14, wiring member(s) (net) between cells is extracted from each wiring member of the integrated circuit LSI#1, and a capacitance of each extracted inter-cell wiring member(s) is described. This example represents that, for instance, a capacitance of the net w2 that connects the cell aa and the cell ab of the integrated circuit LSI#1 is 13.718.

The integrated circuit power consumption calculating unit 16 calculates power consumption in units of cells by calculating power consumption of the circuit component 22 with reference to the circuit component AND21 within the cell AND21, and the inter-cell wiring capacitance.

The integrated circuit power consumption calculating unit 16 obtains the power consumption of the integrated circuit LSI#1 in each operation cycle by totaling power consumption of all cells that configure the integrated circuit LSI#1. Moreover, the integrated circuit power consumption calculating unit 16 accumulates power consumption of the integrated circuit LSI#1 in all operation cycles, and sets the accumulated value as the power consumption of the integrated circuit.

FIG. 15 illustrates an example of the integrated circuit power consumption information 36 in the integrated circuit LSI#1 illustrated in FIG. 6.

The integrated circuit power consumption information describes static power consumption and dynamic power consumption of the integrated circuit LSI#1, and their total power consumption.

The description example illustrated in FIG. 15 represents that the power consumption of the integrated circuit LSI#1 is static power consumption=311 milliwatts [mW], dynamic power consumption=4.11 watts [W], and the total power consumption=4.42 watts [W].

A flow of the process executed by the integrated circuit power consumption calculating apparatus 1 in this embodiment is described next.

Figure 16:
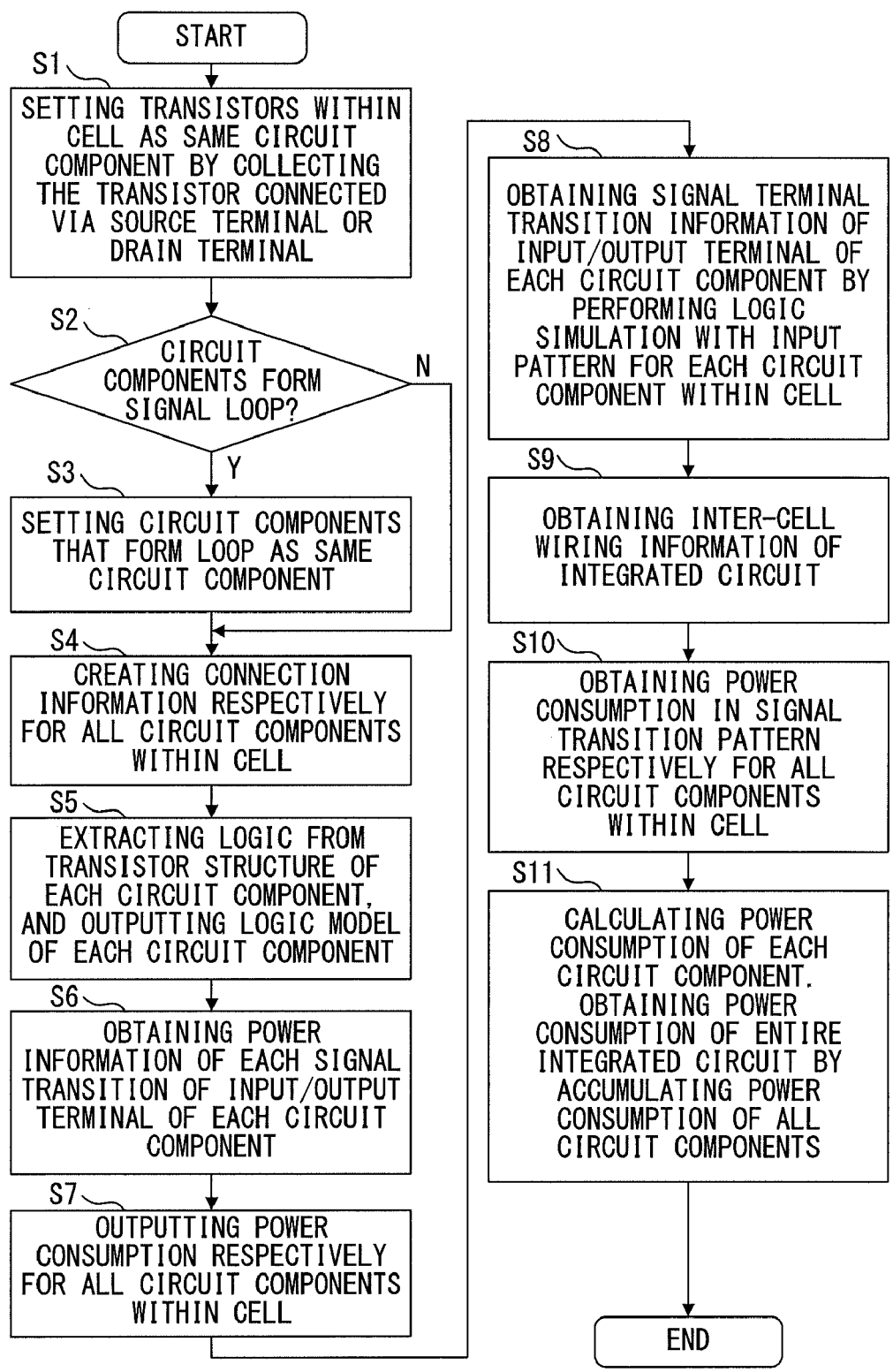
FIG. 16 is a flowchart illustrating a process executed by the integrated circuit power consumption calculating apparatus in the embodiment.

FIG. 16 is a flowchart illustrating the process executed by the integrated circuit power consumption calculating apparatus 1 in this embodiment.

The circuit partitioning unit 11 of the integrated circuit power consumption calculating apparatus 1 integrates, based on cell transistor connection information 22, transistors connected via a source terminal and a drain terminal of any of the transistors included in each of the cells into one circuit component (step S1). The circuit partitioning unit 11 examines whether or not there is a loop (signal loop) for holding a signal by circuit components (step S2). If there is the loop ("Y" in step S2), the circuit partitioning unit 11 sets the circuit components that form the loop as one circuit component (step S3). If there is no signal loop ("N" in step S2), the flow goes to a process of step S4. The circuit partitioning unit 11 creates connection information (circuit component transistor connection information 31) of transistors respectively in all circuit components within the cell (step S4).

The logic model generating unit 12 extracts a logic from a transistor structure of each circuit component based on the circuit component transistor connection information 31, and outputs circuit component logic model information 32 that describes a logic model of each circuit component (step S5).

The circuit component power calculating unit 13 obtains power information (power consumption) in each signal transition state of an input/output terminal of each circuit component based on the circuit component transistor connection information 31 (step S6). Moreover, the circuit component power calculating unit 13 obtains power consumption respectively for all circuit components within the cell, and outputs the circuit component power information 33 (step S7).

The logic simulating unit 14 obtains signal terminal transition information 34 that indicates a signal transition of an input/output terminal of each circuit component by performing a logic simulation with an input pattern in each operation cycle for each circuit component within the cell based on the integrated circuit connection information 21, the input pattern information 24 and the circuit component logic model information 32 (step S8).

The wiring information obtaining unit 15 obtains inter-cell wiring from the integrated circuit layout wiring information 23, and outputs inter-cell wiring information 35 (step S9).

The integrated circuit power consumption calculating unit 16 obtains power consumption in a signal transition of an input/output terminal respectively for all the circuit components within the cell (step S10). The integrated circuit power consumption calculating unit 16 also obtains power consumption of the entire integrated circuit by calculating power consumption of each of the circuit components, and obtains integrated circuit power consumption information 36 by accumulating the power consumption of the integrated circuit, which is obtained in each operation cycle, by the number of all operation cycles (step S11).

As described above, the integrated circuit power consumption calculating unit 16 of the integrated circuit power consumption calculating apparatus 1 can separately total dynamic power and leakage power in the power calculation process of each circuit component within a cell.

By using dynamic power and leakage power of each circuit component, which are calculated by the integrated circuit power consumption calculating unit 16, fluctuations in leakage power, which is apt to be caused depending on a temperature, a transistor manufacturing process condition or the like, can be corrected based on results of the power calculation. As a result, influences that are exerted by a temperature condition or the like and cannot be determined in a design phase can be evaluated based on results of the power consumption calculation.

FIG. 17 is an explanatory view of applying results, output from the integrated circuit power consumption calculating apparatus 1, of the power consumption calculation performed in units of circuit components of the integrated circuit to a study of improving a design.

A cell illustrated in FIG. 17 includes an 8-to-1 selector that has eight input terminals A1 to A8 and one output terminal X and is configured with 2-to-1 selectors in three stages.

When power consumption of the cell illustrated in FIG. 17 is obtained with a conventional method, power consumed when a signal of the input terminal A changes depending on a state of a selection signal of terminals S1, S2 and S3. The power consumption of the cell is minimized when the selection signal S1 of the selectors #11 to #14 for the first stage selects the input terminal A2. In contrast, the power consumption of the cell is maximized when the selection signal of the terminals S1, S2 and S3 is set so that the selectors #11 to #17 in the three stages propagate a signal from the input terminal A1. All the input terminals A2 to A8 are similar. However, if power of each of all the input terminals A1 to A8 is obtained under a condition that an input signal always causes maximum power consumption, the power consumption becomes an excessive value that cannot actually occur when signals of all the input terminals A1 to A8 change.

Additionally, power consumed when the signal of the terminals S1, S2 and S3 changes depending on a state of the signals of the input terminals A1 to A8. Accordingly, power consumed when the terminal S1, S2 and S3 changes is forced to have a value obtained based on any prerequisite. For example, settings such that the power of the cell, which is obtained with some random patterns, is evenly divided to the respective input terminals are made. Normally, however, power consumed by the terminal S2 is higher than that consumed by the terminal S3. This is because the number of operating circuits for the terminal S2 is larger. Moreover, power consumed by the terminal S1 is higher than that consumed by the terminal S2 because the number of operating circuits for the terminal S1 is larger. Accordingly, the power consumption of the cell can be reduced by designing the cell so that a signal having the highest frequency of a signal transition is connected to the terminal S3 and a signal having the lowest frequency of a signal transition is connected to the terminal S1 among control signals to be connected to the terminals S1, S2 and S3.

To properly calculate a change in power consumption of a cell, which is caused by such a control signal replacement, it is preferable that the circuit partitioning unit 11 of the integrated circuit power consumption calculating apparatus 1 partitions a cell that operates as an 8-to-1 selector into circuit components and the power of the cell is calculated based on power in units of circuit components that respectively operate as 2-to-1 selectors.

As a study of improving power consumption in a design phase of the integrated circuit having the configuration illustrated in FIG. 17, a comparison is made between power consumption before a connection state of a control signal to a selector changes and power consumption after the connection state of the control signal of the selector changes, so that a design of the cell can be changed to the connection state that is effective at reducing the power consumption.

As one conventional method of partitioning the inside of a cell, there is a method of partitioning a circuit in order for a timing analysis within a cell. With the circuit partitioning method for a timing analysis, only a case where a change of an input signal reaches an output needs to be taken into account. However, for a power consumption calculation of an integrated circuit, also a change of an input signal, which does not reach an output, needs to be taken into account as in the case of power in the signal change of the input terminal A1 in the cell (8-to-1 selector) illustrated in FIG. 17.

Due to such a discrepancy, with the partitioning of a cell into circuits for a timing analysis, it is preferable to collect circuit component candidates within a cell as many as possible in order to improve the accuracy of a timing calculation, and to set the components as one circuit component. In contrast, with the partitioning of a cell into circuits for a power consumption calculation, it is preferable to partition circuit components within a cell as individually as possible. This is because the accuracy of the power consumption calculation needs to be ensured by extracting signal transitions as many as possible within a cell.

Figure 18:
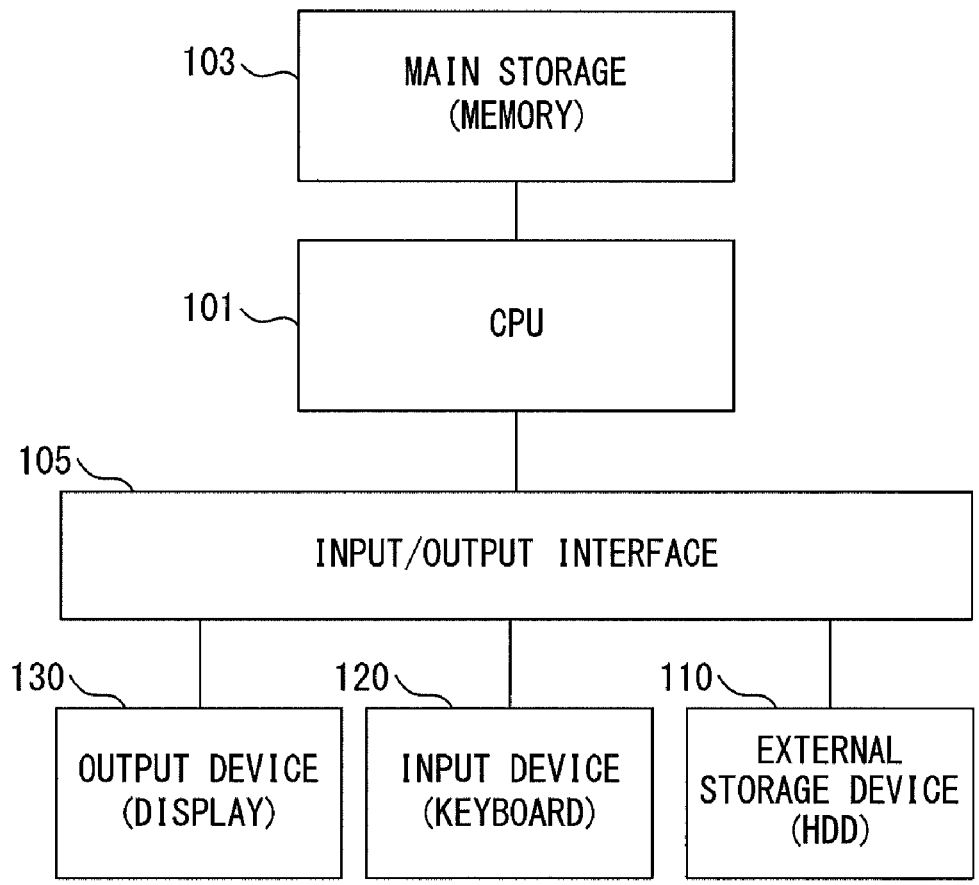
FIG. 18 illustrates an example of a hardware configuration of the integrated circuit power consumption calculating apparatus when being implemented.

FIG. 18 illustrates an example of a hardware configuration of the integrated circuit power consumption calculating apparatus 1.

As illustrated in FIG. 18, the integrated circuit power consumption calculating apparatus 1 can be implemented with a computer 100 having a CPU 101, a main storage (memory) 103, an input/output interface 105, an external storage device 110, an input device (keyboard or the like) 120, an output device (display or the like) 130.

Additionally, the integrated circuit power consumption calculating apparatus 1 can be implemented with a program executable by the computer 100. In this case, the program that describes processing contents of functions to be possessed by the integrated circuit power consumption calculating apparatus 1 is provided. The computer 100 executes the provided program, whereby the above described processing functions of the integrated circuit power consumption calculating apparatus 1 are implemented on the computer 100.

Namely, the circuit partitioning unit 11, the logic model generating unit 12, the circuit component power calculating unit 13, the logic simulating unit 14, the wiring information obtaining unit 15, the integrated circuit power consumption calculating unit 16 and the like of the integrated circuit power consumption calculating apparatus 1 can be configured with the program, and the storing unit 20 can be configured with the external storage device 110.

The computer 100 may execute a process according to a program by directly reading the program from a portable recording medium. Alternatively, the computer 100 can also execute a process according to a received program each time the program is transferred from a server computer.

Furthermore, the program can be recorded on a recording medium that can be read by the computer 100.

As described above, the present invention achieves the following effects.

The integrated circuit power consumption calculating apparatus disclosed as one embodiment of the present invention obtains power consumption of a cell by further partitioning an inside of the cell into circuit components for each of cells that configure an integrated circuit inclusive of a cell having a large number of input/output terminals and a large number of transistors, a cell that internally holds many logic states and other cells, and by obtaining power consumption of each of the partitioned circuit components into which the inside of the cell is partitioned. As a result, with the disclosed integrated circuit power consumption calculating apparatus can calculate power consumption of an integrated circuit with higher accuracy than a process for calculating power consumption only based on a state of an input/output terminal of a cell. Accordingly, estimate accuracy of power consumption of an integrated circuit including a large-scale cell can be improved.

A SPICE simulation process normally used to calculate an estimate or the like of power consumption of an integrated circuit has a characteristic such that a time needed for the process significantly increases with a growing number of transistors. Therefore, with a conventional method, when a power value of a cell in each transition state of an input/output signal is calculated in units of cells in a power consumption calculation of an integrated circuit, a simulation is simplified to degrade the accuracy of the power calculation, for example, by sampling some patterns to reduce the number of patterns without using all patterns of pattern information of signal transitions, the power of which is obtained, for a cell including many transistors that consume power by using a power value in units of cells, and the power consumption of the cell is obtained.

The integrated circuit power consumption calculating apparatus 1 disclosed in this application can obtain power consumption of a cell without reducing the number of patterns of signal transitions by obtaining power consumption with a logic simulation process executed for each of circuit components into which a cell is partitioned.

Also the number of patterns of signal transitions at the time of a logic simulation can be reduced by partitioning a cell.

Additionally, the integrated circuit power consumption calculating apparatus 1 can separately obtain dynamic power generated by a through current of a transistor or a discharge to a load, and leakage power such as off leakage or gate leakage of a transistor in the power calculation process of a circuit component. The integrated circuit power consumption calculating apparatus 1 can not only improve accuracy of a calculation of power (dynamic power) at the time of a signal transition but obtain leakage power based on an accurate signal state of a transistor within a circuit component also when the leakage power is calculated.

Furthermore, as for influences that a wiring capacitance between circuit components exerts on power, the integrated circuit power consumption calculating apparatus 1 can calculate a wiring capacitance between circuit components by adding the capacitance to an output side of each circuit component. As a result, the wiring capacitance between circuit components is added to a power calculation in an output signal transition of each circuit component, thereby eliminating the need for performing another calculation.

Still further, the integrated circuit power consumption calculating apparatus 1 can closely analyze a circuit component that consumes a lot of power because the apparatus can output integrated circuit power consumption information 36 by calculating details of power consumption of circuit components within a cell. Accordingly, a circuit design can be changed based on analysis results of power consumption, which are obtained when an integrated circuit is designed, whereby power consumption can be reduced by improving a design.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made thereto without departing from the spirit and scope of the invention.

What is claimed is:

1. A calculating apparatus for calculating power consumption of an integrated circuit, the calculating apparatus comprising:
an integrated circuit connection information storing unit configured to store integrated circuit connection information that indicates a connection relationship among circuits included in an integrated circuit;
a transistor connection information storing unit configured to store transistor connection information that indicates a connection relationship among transistors included in each of cells that configure the integrated circuit;
an input pattern information storing unit configured to store input pattern information that indicates a signal input pattern used for a logic simulation of the integrated circuit;
a wiring information storing unit configured to store inter-cell wiring information that indicates wiring among the transistors of the integrated circuit;
a circuit partitioning unit configured to identify, based on the transistor connection information, transistors as a same circuit component by collecting the transistors connected via a source terminal and a drain terminal of any of the transistors included in each of the cells for each of the cells of the integrated circuit, and to output circuit component transistor connection information that indicates the connection relationship among the transistors of each identified circuit component;
a logic extracting unit configured to extract a logic for each of the circuit components from the circuit component transistor connection information, and to output circuit component logic model information that indicates the extracted logic of each of the circuit components;
a power calculating unit configured to obtain, based on the circuit component transistor connection information, power information of each signal transition state of an input/output terminal for each of the circuit components, and to output circuit component power information that is power information of each of the circuit components;
a logic simulating unit configured to generate signal terminal transition information that indicates a signal transition of an input/output terminal of each of the circuit components by performing a logic simulation for each of the circuit components of the integrated circuit based on the integrated circuit connection information, the input pattern information and the circuit component logic model information; and
an integrated circuit power consumption calculating unit configured to obtain power consumption in a signal transition of the input/output terminal of each of the circuit components based on the integrated circuit connection information, the signal terminal transition information, the circuit component logic model information and the circuit component power information, and to obtain power consumption of the integrated circuit based on the power consumption of each of the circuit components, which is obtained on the basis of the inter-cell wiring information.

2. The calculating apparatus according to claim 1, wherein if the set circuit component is connected to a latch circuit for holding a predetermined logic state, the circuit partitioning unit sets the circuit component and the latch circuit as the same circuit component.

3. The calculating apparatus according to claim 1, further comprising
a wiring information obtaining unit configured to obtain layout wiring information that indicates a layout and wiring of transistors included in the integrated circuit, and to extract the inter-cell wiring information.

4. A calculation method for power consumption of an integrated circuit by a computer having an information processing unit for storing integrated circuit connection information that indicates a connection relationship among circuits included in an integrated circuit, transistor connection information that indicates a connection relationship among transistors included in each of cells that configure the integrated circuit, input pattern information that indicates a signal input pattern used for a logic simulation of the integrated circuit, and inter-cell wiring information that indicates wiring among the transistors of the integrated circuit when calculating power consumption of the integrated circuit in an integrated circuit power consumption calculating apparatus, the calculation method comprising:
identifying, based on the transistor connection information, transistors as a same circuit component by collecting the transistors connected via a source terminal and a drain terminal of any of the transistors included in each of cells for each of the cells of the integrated circuit;
outputting circuit component transistor connection information that indicates a connection relationship among the transistors of each identified circuit component;
extracting a logic from the circuit component transistor connection information for each of the circuit components, and to output circuit component logic model information that indicates the extracted logic of each of the circuit components;
obtaining, based on the circuit component transistor connection information, power information of each signal transition state of an input/output terminal for each of the circuit components, and outputting circuit component power information that is power information of each of the circuit components;
generating signal terminal transition pattern information that indicates a signal transition of an input/output terminal of each of the circuit components by performing a logic simulation for each of the circuit components of the integrated circuit based on the integrated circuit connection information, the input pattern information and the circuit component logic model information; and
obtaining power consumption in a signal transition of the input/output terminal of each of the circuit components based on the integrated circuit connection information, the signal terminal transition information, the circuit component logic model information and the circuit component power information, and obtaining power consumption of the integrated circuit based on the power consumption of each of the circuit components, which is obtained on the basis of the inter-cell wiring information.

5. The calculation method, wherein
if the set circuit component is connected to a latch circuit for holding a predetermined logic state, the circuit component and the latch circuit are set as the same circuit component in the setting.

6. A non-transitory computer-readable medium on which is recorded an integrated circuit power consumption calculation program for causing a computer, which has an information processing unit for storing integrated circuit connection information that indicates a connection relationship among circuits included in an integrated circuit, transistor connection information that indicates a connection relationship among transistors included in each of cells that configure the integrated circuit, input pattern information that indicates a signal input pattern used for a logic simulation of the integrated circuit, and inter-cell wiring information that indicates wiring among the transistors of the integrated circuit when calculating power consumption of the integrated circuit in an integrated circuit power consumption calculating apparatus having an integrated circuit connection information storing unit configured to store integrated circuit connection information that indicates a connection relationship among circuits included in an integrated circuit, a transistor connection information storing unit configured to store transistor connection information that indicates a connection relationship among transistors included in each of cells that configure the integrated circuit, an input pattern information storing unit configured to store input pattern information that indicates a signal input pattern used for a logic simulation of the integrated circuit, a wiring information storing unit configured to store inter-cell wiring information that indicates wiring among the transistors of the integrated circuit, a circuit partitioning unit configured to identify, based on the transistor connection information, transistors as a same circuit component by collecting the transistors connected via a source terminal and a drain terminal of any of the transistors included in each of the cells for each of the cells of the integrated circuit, and to output circuit component transistor connection information that indicates the connection relationship among the transistors of each identified circuit component, a logic extracting unit configured to extract a logic from the circuit component transistor connection information for each of the circuit components, and to output circuit component logic model information that indicates the extracted logic of each of the circuit components, a power calculating unit configured to obtain, based on the circuit component transistor connection information, power information of each signal transition state of an input/output terminal for each of the circuit components, and to output circuit component power information that is power information of each of the circuit components, and a logic simulating unit configured to generate signal terminal transition information that indicates a signal transition of an input/output terminal of each of the circuit components by performing a logic simulation for each of the circuit components of the integrated circuit based on the integrated circuit connection information, the input pattern information and the circuit component logic model information, and an integrated circuit power consumption calculating unit configured to obtain power consumption of a signal transition of the input/output terminal of each of the circuit components based on the integrated circuit connection information, the signal terminal transition information, the circuit component logic model information and the circuit component power information, and to obtain power consumption of the integrated circuit based on the power consumption of each of the circuit components, which is obtained on the basis of the inter-cell wiring information, to execute:

identifying, based on the transistor connection information, transistors as a same circuit component by collecting the transistors connected via a source terminal and a drain terminal of any of the transistors included in each of the cells for each of the cells of the integrated circuit;

outputting circuit component transistor connection information that indicates a connection relationship among the transistors of each identified circuit component;

extracting a logic for each of the circuit components from the circuit component transistor connection information, and to output circuit component logic model information that indicates the extracted logic of each of the circuit components;

obtaining, based on the circuit component transistor connection information, power information of each signal transition state of an input/output terminal for each of the circuit components, and outputting circuit component power information that is power information of each of the circuit components;

generating signal terminal transition pattern information that indicates a signal transition of an input/output terminal of each of the circuit components by performing a logic simulation for each of the circuit components of the integrated circuit based on the integrated circuit connection information, the input pattern information, and the circuit component logic model information; and obtaining power consumption of a signal transition of the input/output terminal of each of the circuit components based on the integrated circuit connection information, the signal terminal transition information, the circuit component logic model information and the circuit component power information, and obtaining the power consumption of the integrated circuit based on the power consumption of each of the circuit components, which is obtained on the basis of the inter-cell wiring information.

7. The non-transitory computer-readable medium according to claim 6, the integrated circuit power consumption calculation program further causing the computer to execute:

if the set circuit component is connected to a latch circuit for holding a predetermined logic state, the circuit component and the latch circuit are set as the same circuit component in the setting.

* * * * *